United States Patent [19]
Lodetti

[11] Patent Number: 5,444,205
[45] Date of Patent: Aug. 22, 1995

[54] METHOD OF AND APPARATUS FOR ELECTRO-EROSIVE MACHINING

[75] Inventor: Attilio Lodetti, Losone, Switzerland

[73] Assignee: AG Fur Industrielle Elektronik, Losone, Switzerland

[21] Appl. No.: 164,673

[22] Filed: Dec. 8, 1993

[30] Foreign Application Priority Data

Dec. 21, 1992 [DE] Germany .......... 42 43 392.4

[51] Int. Cl.⁶ .................. B23H 7/06; B23H 7/20
[52] U.S. Cl. ...................... 219/69.12; 364/474.04
[58] Field of Search .......... 219/69.12, 69.11, 69.16,
219/69.17, 69.13; 356/376, 377; 364/474.04,
474.29, 474.35, 474.37

[56] References Cited

U.S. PATENT DOCUMENTS

| | | |
|---|---|---|
| 3,605,909 | 9/1971 | Lemelson . |
| 4,688,184 | 8/1987 | Taniguti et al. .......... 356/376 |
| 4,939,379 | 7/1990 | Horn .................. 356/376 |
| 4,957,369 | 9/1990 | Antonsson .......... 356/376 |
| 5,343,402 | 8/1994 | Matsuura et al. .......... 364/474.37 |

FOREIGN PATENT DOCUMENTS

| | | | |
|---|---|---|---|
| 2811299 | 9/1979 | Germany .......... | 219/69.11 |
| 8508484 | 11/1985 | Germany . | |
| 4115896 | 11/1992 | Germany . | |
| 58-77408 | 5/1983 | Japan .......... | 219/69.13 |
| 58-137528 | 8/1983 | Japan .......... | 219/69.12 |
| 58-206316 | 12/1983 | Japan . | |
| 60-085829 | 5/1985 | Japan . | |
| 60-108229 | 6/1985 | Japan . | |
| 60-259327 | 12/1985 | Japan .......... | 219/69.11 |
| 62-102920 | 5/1987 | Japan . | |
| 63-11226 | 1/1988 | Japan . | |
| 03121721 | 5/1991 | Japan . | |
| 3-136722 | 6/1991 | Japan .......... | 219/69.16 |
| 3-264212 | 11/1991 | Japan .......... | 219/69.13 |

OTHER PUBLICATIONS

Patent Abstracts of Japan, vol. 9, No. 229 (M413)(1952); Sep. 14, 1985.
Patent Abstracts of Japan, vol. 15, No. 321 (M1147) Aug. 15, 1991
Patent Abstracts of Japan, vol. 9, No. 261 (M422)(1984) Oct. 18, 1985.
Patent Abstract of Japan, vol. 8, No. 54 (M282)(1491) Mar. 10, 1984.
R. Sautter, "Numerische Steuerungen für Werkzeug-Maschinen", Vogel Buchverlag, Würzburg, 2. Auflage, 1987, pp. 29–32.

Primary Examiner—Geoffrey S. Evans
Attorney, Agent, or Firm—Cohen, Pontani, Lieberman, Pavane

[57] ABSTRACT

A method and an apparatus electro-erosive machining for cutting a workpiece with an electrode in the form of a wire which is guided by at least one guiding head. A mechanism is incorporated for orienting either the workpiece or the electrode or both within a coordinate system, utilizing a sensor that determines the position of the surface of the workpiece within the coordinate system.

13 Claims, 3 Drawing Sheets

METHOD OF AND APPARATUS FOR ELECTRO-EROSIVE MACHINING

BACKGROUND OF THE INVENTION

1. Field of the Invention

This invention relates to a method of and an apparatus for electro-erosive machining. More specifically, it relates to a method of cutting a workpiece with an electrode in the form of a wire secured in at least one guiding head. Either the workpiece or the wire guiding head or both are at least initially oriented within a three-dimensional coordinate system. The apparatus for carrying out the method includes a wire guiding head in the form of a wire secured in at least one guide and a mechanism for orienting either the workpiece or the wire guiding head or both within a coordinate system.

2. Background of the Related Art

One particular problem encountered in optimizing the operation of an electro-erosive machine is idling. The machine may, for example, have to be kept idle for quite some time while it is set tip for a subsequent step or new procedure. Since shortening idling time reduces cost and improves exploitation, it is accordingly a constant objective in the development of electro-erosive machining. It is the initial orientation of the workpiece or wire electrode within the coordinate system that often requires keeping the machinery idle for a considerable time.

Orienting the wire electrode perpendicular to the surface of the workpiece (or in any other desired initial direction) is particularly difficult in cutting a workpiece. This operation takes considerable time and care at the current state of electro-erosive machining and requires relatively expensive arrangement for the wire positioning. One known approach involves designating at least one side of the workpieces as a reference surface and moving it to various X and Y coordinates at constant Z as established by comparator circuitry. When the workpiece is curved or thick, a reference point is usually bored into it to help locate it in the XY plane. In this event the workpiece is advanced until the bore arrives at a prescribed position.

The position of the reference surface of the workpiece in the XY plane is usually fine-adjusted with screws accommodated in a jig. Such a mechanism, however, can lead to deformation while he workpiece is being secured in it.

Positioning precision can also be detrimentally affected when the fine adjustment arrangement is inserted between the workpiece and the upper guide head. More room to maneuver than is needed while the workpiece is actually being cut out must accordingly be provided along the Z axis by raising the upper wire guide head farther off the surface of the workpiece. The longer Z-axis segment, however, also makes for even more potential errors and greater uncertainty in positioning the workpiece. Finally, each workpiece has to be positioned separately, even when several similar or different shapes are secured at the machining point.

How precisely the wire electrode itself can be oriented in relation to the workpiece depends on how precisely the workpiece is positioned on its supporting surface (usually about 3 $\mu$m), how precisely any additional wire electrode-orientation mechanisms can be adjusted, and how precisely the contact between the wire electrode and the usually mutually perpendicular sides of the fine-adjustment mechanism can be defined. How the wire electrode comes into contact with the fine-adjustment mechanism is also extremely critical to these procedures because lateral force must be exerted on the wire electrode in order to fine-adjust it relative to the workpiece. This force occasions a difficult-to-handle lateral deflection and accordingly even more imprecision in the position of the wire electrode relative to the workpiece.

SUMMARY OF THE INVENTION

The object of the present invention is to simplify positioning the workpiece for electro-erosive machining and in particular the wire electrode in relation to the workpiece for electro-erosive cutting.

The invention attains this object in accordance with the invention in the generic method by detecting with a sensor the situation of at least one of the surfaces of the workpiece in the coordinate system and in the generic apparatus by a sensor that detects that situation in the coordinate system.

One particular advantage of the invention is accordingly that the situation of at least one surface of the workpiece within the machine's coordinate system can be detected by one or more sensors. This approach is based on the discovery that correctly orienting the wire electrode in relation to the workpiece does not depend on precisely situating the surface of the workpiece perpendicular to the Z axis. All that is necessary is awareness of the position of the workpiece or of the situation of its surface within the coordinate system. A "machining" coordinate system can then be established in accordance with that situation, which may slope at an angle to the three axes of the initial "positioning" coordinate system. The machining system will accordingly be independent of the positioning system and may differ from it. It will, however, be derived from it by an appropriate series of transformations. The wire electrode can accordingly be oriented perpendicular to the workpiece from awareness of the machining coordinate system alone and without special fine-adjustment mechanisms. The wire electrode fine-adjustment mechanism is in fact replaced to advantage by an appropriately designed transducer. The only adjustment mechanism still necessary is one to coarse-adjust the position of the workpiece parallel to the X and Y axes.

The position of the workpiece can in one advantageous embodiment of the invention also be detected in relation to the X axis, the Y axis, or both by the appropriate sensors. Positions can now be corrected electronically instead of mechanically.

The instrument in one particularly preferred embodiment of the invention is a distance-sensitive sensor mounted on or integrated into one of the wire electrode guiding heads and detecting the distance along the Z axis of at least three different points on the surface of the workpiece. The situation of at least one area of that surface within the coordinate system can in a more advanced version of that embodiment then be calculated from the positions of the at least three points. When at least some of the surface of the workpiece is flat, the situation of the flat area in space within the machine coordinate system, can be calculated by simple trigonometry from the measured distances along the Z axis in conjunction with the known X and Y coordinates of the three points.

The wire electrode can subsequently be oriented in the UV plane perpendicular to the surface of the workpiece in accordance with the known situation of that surface in one particularly preferred advanced version of the invention by moving the wire electrode guiding head. Complicated orientation of the wire electrode in relation to the workpiece is accordingly almost entirely eliminated, replaced by automatic displacement of the wire electrode's "zero point" with the UV carriages.

The workpiece is initially positioned relative to the X and Y axes by screws (the fineadjustment mechanism) in another preferred embodiment of the invention. This approach allows preliminary fine adjustment of the workpiece in the XY plane without precise fine orientation along the Z axis. The "fine orientation" is subsequently replaced by the aforesaid orientation of the wire electrode with the distance sensor in accordance with appropriate movement of the UV carriages.

The distance sensor is retracted slightly from the surface of the workpiece in another embodiment of the invention once its situation has been determined. This procedure discontinues the contact between the sensor and the surface of the workpiece and interrupts the transmission of signals. How far the sensor is retracted depends on its resolution, its ability in other words to detect slight differences in distance. A retraction of approximately 0.01 mm for example has been demonstrated practical. To prevent contact with the jig, however, the sensor can be retracted as far as 10 mm.

Another especially preferred embodiment of the invention features in addition to the distance sensor a subroutine in the computerized numerical controls or the associated software that will orient the wire electrode by a) probing in the vicinity of the workpiece the wire guiding head that has the distance sensor and establishing the position along the Z axis once the surface of the workpiece has arrived at three different points in the XY plane in succession, b) calculating the location of the surface of the workpiece in the machine coordinate system, and c) calculating and carrying out UV movements with the wire electrode guiding head in order to compensate for any skewing of the surface of the workpiece in relation to the XY plane.

All that is necessary to comprehensively and practically reequip any electro-erosive machine in accordance with this embodiment of the invention are a distance sensor and a data-storage device, e.g., a diskette recorded with the aforesaid software routine.

It is also possible to utilize additional distance sensors to precisely determine the positioning of other surfaces of the workpiece. Particular advantages, e.g., of saving time while orienting the workpiece and the wire electrode, can be obtained while using just one distance sensor (or a probe or both) integrated into the wire guiding head.

It is of particular advantage to design the sensor as a moving two-point system with two fixed points at the "top" and "bottom". The sensor will be retracted approximately 1 cm into its rest position away from the workpiece once the distance has been sensed.

Although there are no limits on the sensor design, it is preferred to keep the sensor small (due to the lack of space in many electro-erosive machines). It is also of advantage to subject the sensor to little or no mechanical stress and strain in order to eliminate the need for readjustments.

One advantageous design of the sensor is to interact electromechanically and/or electromagnetically and/or electrically with the workpiece and/or to function optically, mechanically, pneumatically, or by infrared radiation.

BRIEF DESCRIPTION OF THE PREFERRED EMBODIMENTS

Preferred embodiments of the present invention will now be specified with reference to the schematic drawing, wherein FIG. 1 is a view of the components of an electro-erosive machine in accordance with the invention, FIGS. 2a through 2c illustrate various strategies for carrying out a method in accordance with the invention, and FIG. 3 is a view of another embodiment of the invention.

DESCRIPTION OF THE PREFERRED EMBODIMENT

The terminology employed hereinafter is intended to facilitate comprehension of the present invention without limiting it in any way. The terms "top," "bottom," "narrower," and "wider" are to be understood as referring to apparatus of conventional orientation and size and to conventionally mounted workpiece.

Figure 1:
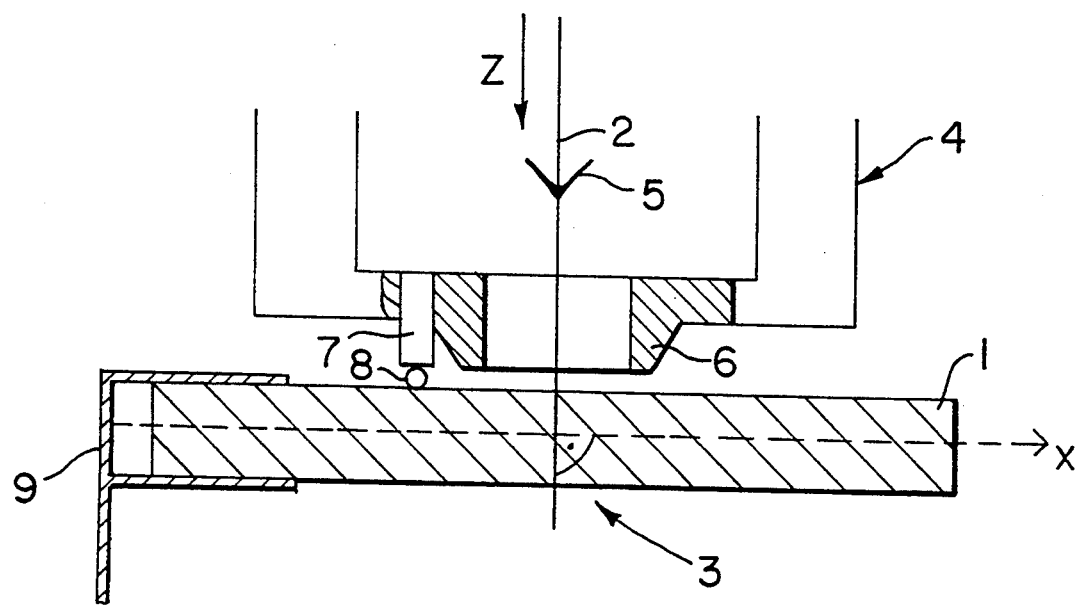

FIG. 1 illustrates for simplicity's sake only some of the apparatus for electro-erosive machining in accordance with the invention. Basic elements like the stand, flushing system, generator, and computerized numerical controls are considered to be in themselves known and are accordingly not specified.

An electrode 2 in the form of a wire is advanced through the apparatus in the direction indicated by arrow Z, usually from top to bottom, through a machining point 3 at workpiece 1. The cathode conventionally travels through a vertical passage in an upper wire guiding head 4 and through a V-groove 5 integrated therein. Wire guiding head 4 rides on an unillustrated arm through a UV plane and can be raised and lowered along the Z axis. Such a guide usually accommodates unillustrated interior electric circuitry that conveys pulses from a generator. The guiding head also accommodates lines that supply through a nozzle 6 the dielectric flushing necessary for the machining process.

As it leaves the workpiece 1, electrode 2 arrives for example in an unillustrated lower wire guiding head similar to upper wire guiding head 4, but mounted on a lower arm. Since these elements arc state-of-the-art, they will not be specified herein.

The upper wire guiding head 4 also accommodates a sensor, a distance sensor 7 in the present case that interacts electrically with workpiece 1. At the bottom of distance sensor 7 is a head 8. The sensor supplies an electric registration pulse to the apparatus' controls as long as head 8 is in contact with workpiece 1.

The workpiece 1 is secured to a surface (not shown) by a tensioning mechanism 9. The position of the workpiece in the XY plane can be fine-adjusted with screws for example.

Distance sensor 7 fixes or records the Z-axis coordinate point as soon as it comes into contact with or into the vicinity of tensioned workpiece 1. Sensor 7 is accommodated preferably in or on the upper wire guiding head 4 where it can detect how far away it is from the workpiece 1 while the guide is in the cutting position (with the workpiece in the immediate vicinity of the wire guiding head). To keep the distance sensor 7 from sensing constantly, the upper wire guiding head 4 can be lifted or retracted approximately 0.01 min.

Figure 3:
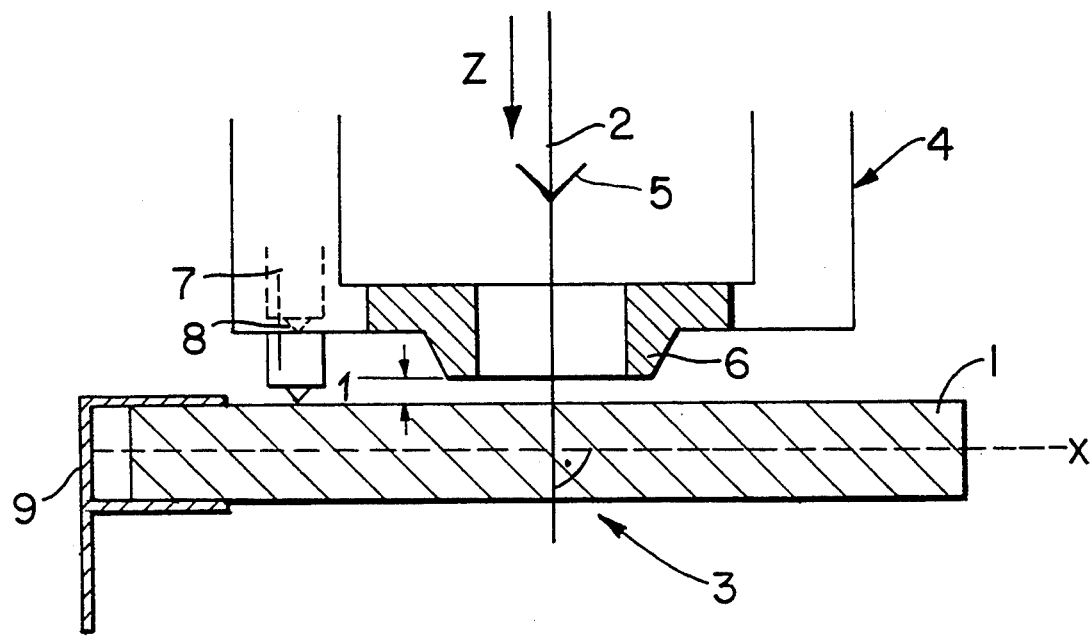

The sensor 7 in the embodiment illustrated in FIG. 3 on the other hand can be retracted approximately 10 mm from the workpiece subsequent to obtaining a measurement into an accordingly definitely remote rest position. Sensor head 8 (a probe in this case), is for this purpose integrated into a piston that travels up and down for example.

One particular advantage of the invention is that the sensor's power of resolution does not need to be especially high. It must only be of an order of magnitude that renders the measurements reproducible.

Figure 2A:
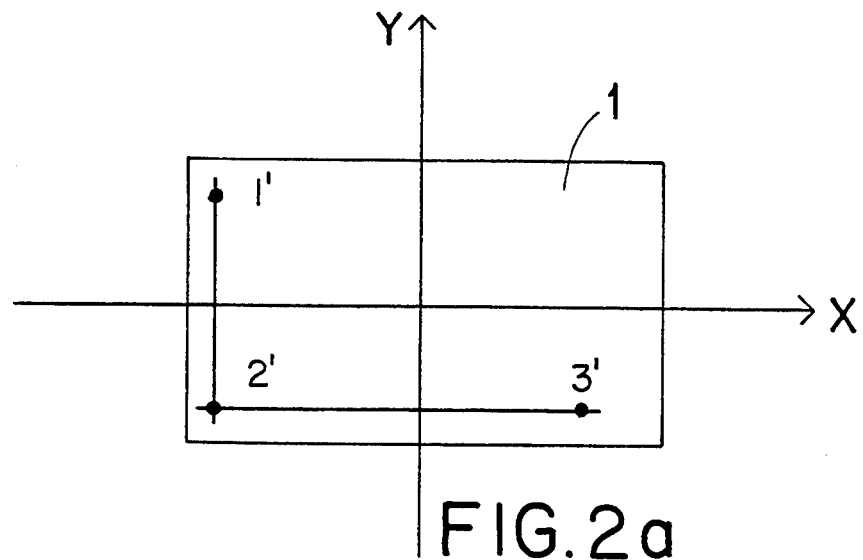
Figure 2B:
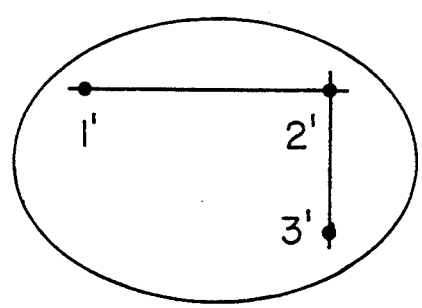
Figure 2C:
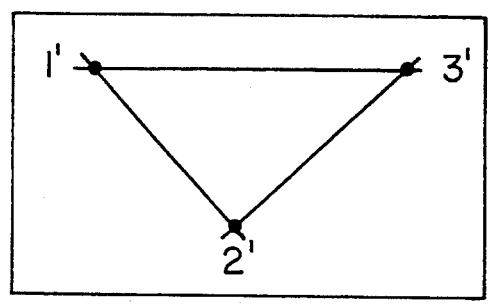

One particularly preferred version of the method in accordance with the invention derives from the interplay between the apparatus illustrated in FIG. 1 and the strategies illustrated in FIGS. 2a through 2c.

The workpiece 1 is initially positioned (by means of the aforesaid screws for example) in relation to the X and Y axes. The Z coordinates associated with three separate points 1', 2', and 3' in the XY plane (cf. FIGS. 2a–2c) are then determined on the surface of workpiece 1 with distance sensor 7. Once sensor 7 has emitted a registration pulse indicating that it has arrived at the surface of the workpiece, the Z-axis encoder that is a component of most electro-erosive machining apparatus will detect the Z coordinate (or the X or Y coordinate or both) with a precision of less than 1 $\mu$m. From a strictly mathematical aspect, the three points 1', 2', and 3' define a plane in the XYZ-coordinate system. From these points it is simple to calculate the theoretical perpendicular or normal to the place. The algebraic equations for this perpendicular are employed to correct the position of upper wire guiding head 4 in the UV plane, positioning electrode 2 perpendicular to the plane of the workpiece. From only three measurements for each workpiece 1 accordingly, it becomes possible to define and store the perpendicular position of the wire. The method can be adapted for use when the surface of the workpiece is not plane but still of a known geometry, parabolic for example.

FIG. 2b illustrates how the invention can be employed with a round workpiece and FIG. 2c illustrates how the points can define an equilateral triangle instead of a right triangle. All that is necessary is for the points to be sufficiently separated in the XY plane to allow the situation of the plane they determine to be precisely defined.

The advantages of the present invention will now be summarized. Fine adjustment of the surface of the workpiece in the XY plane is unnecessary. The tensioning mechanism can accordingly be simpler. There will be no deformation of the fine-adjustment or tensioning mechanisms, increasing the apparatus' reliability and the reproducibility of the machining results. Expensive additional fine-adjustment mechanisms like electrode-aligning devices with fine-adjustment components can be completely eliminated. Uncertainties like those that occur at the state of the art during contact with reference areas of the fine-adjustment mechanism with respect to the position of the electrode will no longer occur. The distance sensor can also be employed advantageously while the workpiece is being cut to precisely detect the position of the workpiece along the Z axis. A well-defined electrode orientation will be obtained for any workpiece secured at the cutting point with no need to reposition the surface of each new workpiece. The perpendicularity of the electrode can be ensured with particular precision (approximately 0.001 mm) due to the reliability and reproducibility of detection. Finally, it will take much less time to orient the electrode, decreasing idle times and improving exploitation of the apparatus.

I claim:

1. A method of electro-erosive machining comprising the steps of
   a. guiding a wire electrode along one guiding head,
   b. orienting initially a workpiece or the wire electrode within a three-dimensional coordinate system,
   c. determining with a sensor the positioning of at least one surface of the work piece in the coordinate system,
   d. calculating the position of at least one area of at least one surface of the workpiece within the coordinate system from at least three detected positions,
   e. storing the calculation into an electronic memory, and
   f. carrying out movements of the wire guiding head during electro-erosive machining to compensate for the actual position of the area of the surface of the workpiece according to the calculation stored into the memory.

2. The method of claim 1, wherein the sensor is a distance sensor and further comprising the steps of
   a. mounting the distance sensor on a wire guiding head, and
   b. determining the position of the at least one workpiece surface in terms of the Z axis by detecting the position of at least three different points substantially separated from one another in the XY plane on the at least one surface.

3. The method of claim 2, further comprising the steps of
   orienting the wire electrode perpendicular to the surface of the workpiece by moving the wire guiding head along a UV plane in accordance with the last calculated area.

4. The method of claim 3, further comprising the steps of
   fine-adjusting the workpiece relative to the X and Y axes mechanically with adjustment screws or by computerized numerically controlled displacement of the reference axes.

5. The method of claim 4, further comprising the steps of
   determining electro-mechanically, optically, electrically, mechanically, by infra-red radiation, electromagnetically, or by any combination of the foregoing the location of the workpiece surface.

6. The method of claim 5, further comprising the steps of
   retracting the sensor once the location of the surface of the workpiece has been determined.

7. An apparatus for electro-erosive machining, having a wire electrode guided by one guiding head and having a mechanism for orienting a work piece or the electrode within a coordinate system, further having a sensor to determine the location of the work piece surface within the coordinate system, wherein the sensor is a distance sensor that determines the location of the work piece surface along the Z axis and determines the positions of various points on the surface, and having a subroutine of the computerized numerical controls or the associated software that orients the wire electrode by
   a. probing with the distance sensor of the wire guide in the vicinity of the work piece and establishing the position along the Z axis once the surface of the work piece has arrived at three different points in the XY plane in succession,
b. calculating the location of the surface of the work piece in the machine coordinate system, and
c. calculating and carrying out UV plane movements with the electrode wire guide in order to compensate for any skewing of the surface of the work piece in relation to the XY plane.

8. The apparatus of claim 7, wherein the distance sensor is mounted on and/or in a guiding head.

9. The apparatus of claim 7, wherein the distance sensor is a system that interacts with the workpiece electromechanically or electromagnetically or electrically or in any combination thereof.

10. The apparatus of claim 7, wherein the distance sensor is an optical system.

11. The apparatus of claim 7, wherein the distance sensor is a mechanical system.

12. The apparatus of claim 7, wherein the distance sensor is a pneumatic system.

13. The apparatus of claim 7, wherein the distance sensor is an infrared system.

* * * * *